United States Patent
Seo et al.

(10) Patent No.: US 8,189,580 B2
(45) Date of Patent: May 29, 2012

(54) METHOD FOR BLOCKING HOST IN IPV6 NETWORK

(75) Inventors: Seung-Ho Seo, Daegu (KR); Hae-Eun Moon, Daegu (KR); Dong-Ho Lee, Daegu (KR)

(73) Assignee: Netman Co., Ltd., Daegu (KR)

( * ) Notice: Subject to any disclaimer, the term of this patent is extended or adjusted under 35 U.S.C. 154(b) by 0 days.

(21) Appl. No.: 13/121,681

(22) PCT Filed: Jan. 15, 2010

(86) PCT No.: PCT/KR2010/000263
§ 371 (c)(1),
(2), (4) Date: Mar. 29, 2011

(87) PCT Pub. No.: WO2010/110530
PCT Pub. Date: Sep. 30, 2010

(65) Prior Publication Data
US 2011/0182293 A1    Jul. 28, 2011

(30) Foreign Application Priority Data
Mar. 20, 2009    (KR) ........................ 10-2009-0024074

(51) Int. Cl.
*H04L 12/28*    (2006.01)
(52) U.S. Cl. ............ 370/389; 709/224; 709/225; 726/1; 370/229; 370/230; 370/392
(58) Field of Classification Search .......... 709/223–225; 726/1; 370/389, 392
See application file for complete search history.

(56) References Cited

U.S. PATENT DOCUMENTS
2001/0034831 A1 * 10/2001 Brustoloni et al. ........... 713/151
(Continued)

FOREIGN PATENT DOCUMENTS
KR    1020030092322    12/2003
(Continued)

OTHER PUBLICATIONS

Narten et al. Neighbor Discovery for IP Version 6 (IPv6). The Internet Society: Network Working Group. RFC 2461. Dec. 1998.*

*Primary Examiner* — Hassan Kizou
*Assistant Examiner* — Ashil Farahmand
(74) *Attorney, Agent, or Firm* — IPLA P.A.; James E. Bame (57) ABSTRACT

Disclosed herein are methods of searching for a host in a network using IPv4 and of blocking and searching a host in an IPv6 network which blocking access to an unauthorized network. The present invention provides a method of searching for a host in an IPv6 network, including the steps of requesting host information, including link-layer address information and IP address information about an IP to be searched for, by sending a Neighbor Solicitation (NS) packet in which the IP to be searched for is set in an ICMPv6 target address to the network, after sending the NS packet, waiting for a predetermined time by taking a processing speed of a host and a transfer rate according to a network environment and state into consideration, after the predetermined time of waiting, determining whether a Neighbor Advertisement (NA) packet of the IP to be searched for has been received, and if, as a result of the determination, the NA packet of the IP to be searched for is determined to have been received, acquiring the host information from the NA packet.

14 Claims, 4 Drawing Sheets

U.S. PATENT DOCUMENTS

| | | | |
|---|---|---|---|
| 2004/0030769 A1* | 2/2004 | Lim et al. | 709/223 |
| 2004/0240669 A1* | 12/2004 | Kempf et al. | 380/277 |
| 2005/0036471 A1* | 2/2005 | Singh et al. | 370/338 |
| 2008/0310323 A1 | 12/2008 | Shrota et al. | |
| 2009/0024758 A1 | 1/2009 | Levy-Abegnoli et al. | |
| 2010/0177774 A1* | 7/2010 | Hart et al. | 370/392 |

FOREIGN PATENT DOCUMENTS

| | | |
|---|---|---|
| KR | 100714131 | 4/2007 |
| KR | 100770354 | 10/2007 |

* cited by examiner

METHOD FOR BLOCKING HOST IN IPV6 NETWORK

BACKGROUND OF THE INVENTION

1. Field of the Invention

The present invention relates to a method of blocking and searching for a host in an IPv4 network and, more particularly, to a method of blocking and searching for a host in an IPv4 network using a Neighbor Discovery Protocol (NDP) in an IPv6 network environment.

2. Background of the Related Art

The exhaustion of IPv4 (that is, a 32-bit address system) is gradually being realized. According to information provided in the IPv6 portal (http://IPv6.vsix.net) of Korea Internet Security Agency, it is expected that IPv4 addresses will be dried up after about 791 days as of Jan. 20, 2009. Lots of companies and government offices which have known the exhaustion of the addresses are performing a task of switching the network from the IPv4 network to an IPv6 network. Accordingly, there is a tendency that a demand for IPv6 is gradually increasing.

Furthermore, in IPv6, the automatic setting of an IP address is supported. If an address is automatically assigned as described above, there is a need to check the IPs of all pieces of equipment and maintain pieces of relevant information from a viewpoint of the management of network resources.

Furthermore, since IP addresses are automatically set, there is a problem in that malicious users may access the major equipment of a network without any restriction. Accordingly, it is necessary to manage and block the users.

SUMMARY OF THE INVENTION

Accordingly, the present invention has been made in view of the above problems occurring in the prior art, and it is an object of the present invention to provide a method of searching for a host, which is capable of efficiently managing the major resources of a network in an IPv6 environment, and a method of blocking and searching for a host in an IPv4 network which is capable of constructing a higher security environment by blocking unauthorized hosts from accessing a network.

To achieve the above object, according to an aspect of the present invention, there is provided a method of searching for a host in an IPv6 network, including the steps of requesting host information about an IP to be searched for, by sending a Neighbor Solicitation (NS) packet in which the IP to be searched for is set in an ICMPv6 target address to the network, after sending the NS packet, waiting for a predetermined time by taking the processing speed of a host and the transfer rate according to a network environment and state into consideration, after the predetermined time of waiting, determining whether the Neighbor Advertisement (NA) packet of the IP to be searched for has been received, and if, as a result of the determination, the NA packet of the IP to be searched for is determined to have been received, acquiring the host information from the NA packet.

According to another aspect of the present invention, there is provided a method of searching for a host in an IPv6 network, including the steps of requesting router information by sending a Router Solicitation (RS) packet to the network, after sending the RS packet, waiting for a predetermined time by taking the processing speed of a router and the transfer rate according to a network environment and state into consideration, after the predetermined time of waiting, determining whether a Router Advertisement (RA) packet has been received, and if, as a result of the determination, the RA packet is determined to have been received, acquiring the router information from the RA packet.

According to yet another aspect of the present invention, there is provided a method of searching for a host in an IPv6 network, including the steps of capturing a Neighbor Discovery Protocol (NDP) packet, determining whether the captured NDP packet is one of RS, NS, and NA packets, and if, as a result of the determination, the captured NDP packet is determined to be one of the RS, NS, and NA packets, acquiring host information from the captured packet or if, as a result of the determination, the captured NDP packet is determined to be an RA packet, acquiring router information from the RA packet.

According to still yet another aspect of the present invention, the host information may further include field information about the NA (Neighbor Advertisement) packet.

According to still yet another aspect of the present invention, the router information includes link-layer address information and IP address information.

According to still yet another aspect of the present invention, the router information may selectively further include field information about RA packet.

According to still yet another aspect of the present invention, at least one of the host information and the router information manages the IP address and the link-layer address in the form of a list.

According to still yet another aspect of the present invention, there is provided a method of blocking a host in an IPv6 network, including the steps of, when a policy for blocking the host from accessing the network is set, capturing a Neighbor Discovery Protocol (NDP) packet within the network, determining whether the captured NDP packet is included in the block policy according to the type of a packet, and if, as a result the determination, the captured NDP packet is included in the block policy, blocking the host by generating a modified NA packet for an IP of the host and sending the modified NA packet in a multicast or unicast IP form.

According to still yet another aspect of the present invention, there is provided a method of blocking a host in an IPv6 network, including the step of, when a policy for blocking the host from accessing the network is set, in the state in which the NDP packet of the blocked host is not set within the network, blocking the host by generating an NA packet modified for the IP of the blocked host and sending the modified NA packet in the form of a multicast or unicast IP.

According to still yet another aspect of the present invention, the host is blocked by multicasting or unicasting the modified NA packet in which a link-layer address of the NA packet is set as a virtual link-layer address or a specific link-layer address not existing in the network.

According to still yet another aspect of the present invention, the policy for blocking the host from accessing the network is managed in a list form.

According to still yet another aspect of the present invention, the policy for blocking the host from accessing the network includes an IP address or a link-layer address.

According to still yet another aspect of the present invention, the policy for blocking the host from accessing the network includes the start time and expiration time of the policy.

According to still yet another aspect of the present invention, the step of blocking the host is performed by sending the modified NA packet to the blocked host so that the allocation of an IP to the network interface of the blocked host is failed.

According to still yet another aspect of the present invention, the step of blocking the host is performed by sending the modified NA packet of the blocked host to hosts within the network to which the blocked host belongs so that neighbor caches are updated based on the modified NA packet of the blocked host and thus communication with the hosts is failed.

According to still yet another aspect of the present invention, the method further includes the step of, if the NDP packet captured in the network is an RS or RA packet, determining whether the host is the blocked host based on the source information of the RS or PA packet.

According to still yet another aspect of the present invention, the method further includes the steps of if the NDP packet captured in the network is an NS packet, determining whether the host is the blocked host based on the source information of the NS packet, if, as a result of the determination, the source information is determined to correspond to the blocked host, determining whether the source information is a Duplicate Address Detection (DAD) check packet, and if, as a result of the determination, the source information is determined not to correspond to the blocked host, determining whether the host is the blocked host based on destination information.

According to still yet another aspect of the present invention, the method further includes the steps of if the NDP packet captured in the network is the NA packet, determining whether the source information of the NA packet corresponds to the blocked host and if, as a result of the determination, the source information is determined not to correspond to the blocked host, determining whether destination information corresponds to the blocked host.

According to still yet another aspect of the present invention, the source information include one or more of the source link-layer address, the source IP address, and the target address of an ICMPv6 header.

According to still yet another aspect of the present invention, the destination information includes one or more of the destination link-layer address, the destination IP address, and the target address of the ICMPv6 header.

BRIEF DESCRIPTION OF THE DRAWINGS

Further objects and advantages of the invention can be more fully understood from the following detailed description taken in conjunction with the accompanying drawings in which.

DETAILED DESCRIPTION OF EMBODIMENTS

Some exemplary embodiments of the present invention will now be described in detail with reference to the accompanying drawings.

According to the present invention, an NDP (Neighbor Discovery Protocol) is used to search for and block hosts in IPv6.

More particularly, there are three kinds of methods of searching for a host. In the first method, host information about a search IP is solicited using a Neighbor Solicitation (Ns) packet. If a corresponding host responds to the solicitation using a Neighbor Advertisement (NA) packet, the host information is acquired from the received packet.

In the second method, router information is solicited using a Router Solicitation (RS) packet. If a router that has received the RS packet responds to the solicitation using a Router Advertisement (RA) packet, the router information is acquired from the received packet.

In the third method, after an NDP packet is captured in a network, host and router information can be acquired according to the type.

The present invention relates to the block of and search for hosts in an IPv6 network environment. If IPv6 is simply expressed by an IP, the IPv6 may be confused with IPv4. It is hereinafter assumed that an IP refers to IPv6 or an IPv6 network, unless IPv4 is specially expressed.

Prior to a description of the present invention, basic technology in IPv6 is first described

1) ICMP

An ICMP is an abbreviation of an Internet Control Message Protocol and is used to exchange messages for a network state. The ICMP is operated in the network layer of Layer3 identical to the IP. The ICMP is basically operated in IPv4, and the major functions of the ICMP are listed in Table 1.

TABLE 1

| Classification | Function | Description |
| --- | --- | --- |
| Error Messages | Destination Unreachable | Message sent to a source when a packet does not reach a destination. The message includes various detailed error messages according to a network condition. |
| | Time Exceeded | Message generated when a TTL (Time-to-Live) value is set to 0. |
| | Redirect | Message used to transmit data through routers other than a basic router in a network including several routers |
| | Source Quench | Message transmitted to a source when data too large to be processed in a destination is received |
| | Parameter Problem | Message generated when IP datagram itself has a problem |
| Informational Messages | Echo Request/ Echo Reply | Message indicating the operating state of a remote system |
| | Timestamp Request/ Timestamp Reply | Message used to check the waiting time of a specific network in a transmission system. |
| | Address Mask Request/ Address Mask Reply | Message used to check the subnet mask of a local network in a host |
| | Router Solicitation/ Router Advertisement | Message used to dynamically update router information in a host without user setting |

2) ICMPv6

ICMPv6 is an ICMP used in IPv6, and it has the same basic functions as the ICMP. The ICMPv6 further includes some protocols, such as ARP, RARP, and IGMP used in IPv4, as listed in Table 2.

TABLE 2

| Classification | Function | Description |
| --- | --- | --- |
| Error Messages | Destination Unreachable | The same as IPv4 |
| | Packet Too Big | Message IPv6 generated when an MTU is exceeded in a path between a source and a destination. Only the source and the destination can split/combine the packets of the message. |
| | Time Exceeded | The same as IPv4 |
| | Parameter Problems | The same as IPv4 |
| Informational Messages | Echo Request/ Echo Reply | The same as IPv4 |
| | Group Membership | Message used when inclusion, exclusion, query, etc. are necessary in a multicast group |
| | Router Solicitation | Message generated in order for a host to search for a router |
| | Router Advertisement | Message used by a router in order to transmit pieces of information (e.g., prefix and MTU) necessary for communication to hosts |
| | Neighbor Solicitation | Message generated by a host in order to check the link-layer address of a neighbor host |
| | Neighbor Advertisement | Message that a corresponding host sends its own link-layer address to a counterpart host in order to inform the link-layer address when there is NS. |
| | Redirect | The same as IPv4 |

3) NDP (Neighbor Discovery Protocol)

The NDP is used for communication with neighbor hosts in an IPv6 environment and is included in the ICMPv6. The NDP takes the place of functions performed by an Address Resolution Protocol (ARP) in an IPv4 environment. The major functions of the NDP are listed in Table 3.

TABLE 3

| Function | Description |
| --- | --- |
| Router and Prefix Discovery | A host finds a router, existing in a network, using router solicitation and router advertisement messages and receives and receives prefix information about the network. |
| Address Resolution | It replaces the functions of the ARP of IPv4 in the NDP of IPv6. A host checks the link-layer address of a neighbor node using NS and NA messages. |
| Redirect | This message has the same function as the redirect message of IPv4. This message is used to send data through routers other than a basic router in a network including several routers. |

4) Type and Use of NDP Packet

In order to implement the major functions of an ND, packets in Table 4 are used.

TABLE 4

| Classification | Description |
| --- | --- |
| RS (Router Solicitation) | Packet that a host uses it to solicit RA information in order to fast acquire network information |
| RA (Router Advertisement) | Packet used by a router in order to inform a host of its own information. The link-layer address, IP, prefix, and MTU information of the router are provided to the host. The RA packet is periodically provided in the form of a multicast IP and is frequently provided at the request of the RS packet. |

TABLE 4-continued

| Classification | Description |
| --- | --- |
| NS (Neighbor Solicitation) | Packet that a host uses it to request link-layer address information in order to perform communication with peripheral host. This packet is also used to check whether a corresponding IP is already being used or not in a network (DAD) after an IP is configured. |
| NA (Neighbor Advertisement) | Packet which is sent at the request of NS or provided in the form of multicast IP in order for a host to rapidly propagate its own information (e.g., a link-layer address and whether a router is operated) |
| Redirect | Packet used to persuade a host to change the path of a packet in order to send the packet through a better path when there are one or more routers in a network |

5) DAD (Duplicate Address Detection)

A method of configuring an IP in IPv6 includes a manual setting method and an automatic setting method (stateless, stateful). Even though either method is used, whether an IP is already being used or not is checked through a DAD process. DAD is a method of checking whether an IP to be used is being used in a current network or not. In DAD, no response is anticipated after an NS packet including an IP to be used is sent to a network. Hosts within a network which have received the NS packet for checking DAD send NA packets to a host that has sent the NS packet if the IP within the NS packet is identical to their IPs. If the IP within the NS packet is not identical to their IPs, the hosts update neighbor caches. Meanwhile, if the NA packets are received, the host that performs DAD determines that the IP to be used is already being used.

A process of performing DAD is simply described below. First, a host A sends an NS packet at a RetransTimer time interval by a set DupAddrDetectTransmits value and then waits for the RetransTimer time. If there is no NA packet response even after a lapse of the RetransTimer time, an IP newly configured is allocated to an interface, and communication is started. On the other hand, in the case where another host B is using the corresponding IP, if the host A attempts to use the corresponding IP, the host B informs that the corresponding IP is already being used by sending an NA packet to the host A. As described above, since the host A checks the NA packet for the corresponding IP, the allocation of the IP is failed.

Hereinafter, a method of searching for and blocking hosts according to an embodiment of the present invention is described in detail.

<Search for Host>

Hosts connected to a network can be searched for using the NS (Neighbor Solicitation) packet, NA (Neighbor Advertisement) packet, RS (Router Solicitation) packet, and RA (Router Advertisement) packet of a NDP. Furthermore, hosts and routers can be searched for by analyzing an NDP packet captured in a network.

Host information described hereinafter basically refers to link-layer address information and IP address information and may further include field information about an NA packet according to circumstances.

Furthermore, router information basically refers to link-layer address information and IP address information and may further include field information about an RA packet according to circumstances.

Figure 1:
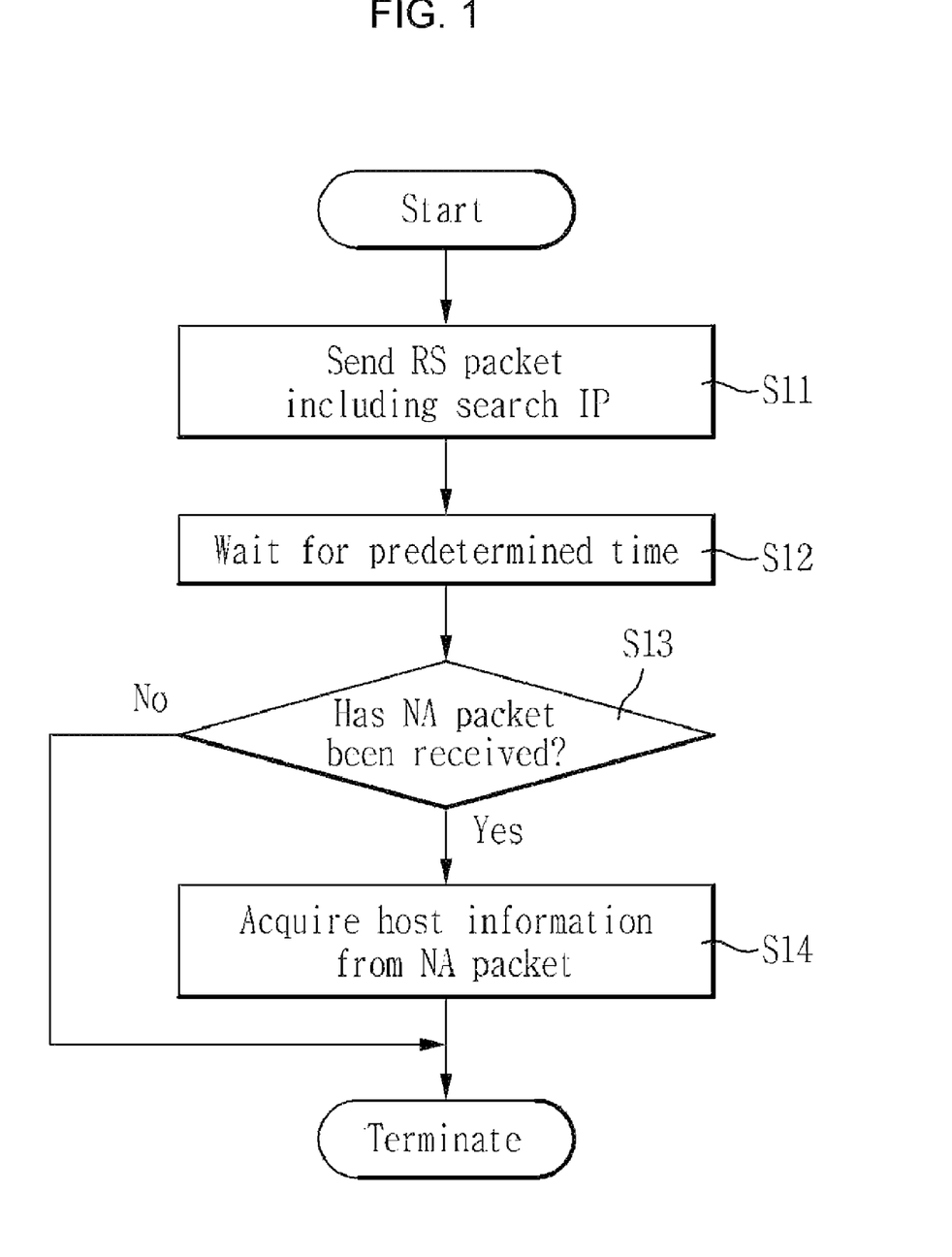
FIG. 1 is a flowchart illustrating a method of searching for a host using an NS packet and an NA packet according to an embodiment of the present invention.

FIG. 1 is a flowchart illustrating a method of searching for a host using an NS packet and an NA packet according to an embodiment of the present invention.

First, host information about an IP to be searched for is requested by sending an NS packet in which the search IP is set in an ICMPv6 target address to a network at step S11.

After the NS packet is transmitted, a predetermined time is waited by taking the processing speed of a host and the transfer rate according to a network environment and state at step S12.

It is then determined whether the NA packet of the search IP has been received after the predetermined time of waiting at step S13. If, as a result of the determination, the NA packet of the search IP is determined to have been received, the host information is acquired from the NA packet at step S14. On the other hand, if, as a result of the determination at step S13, the NA packet of the search IP is determined not to have been received, the processing is terminated.

Figure 2:
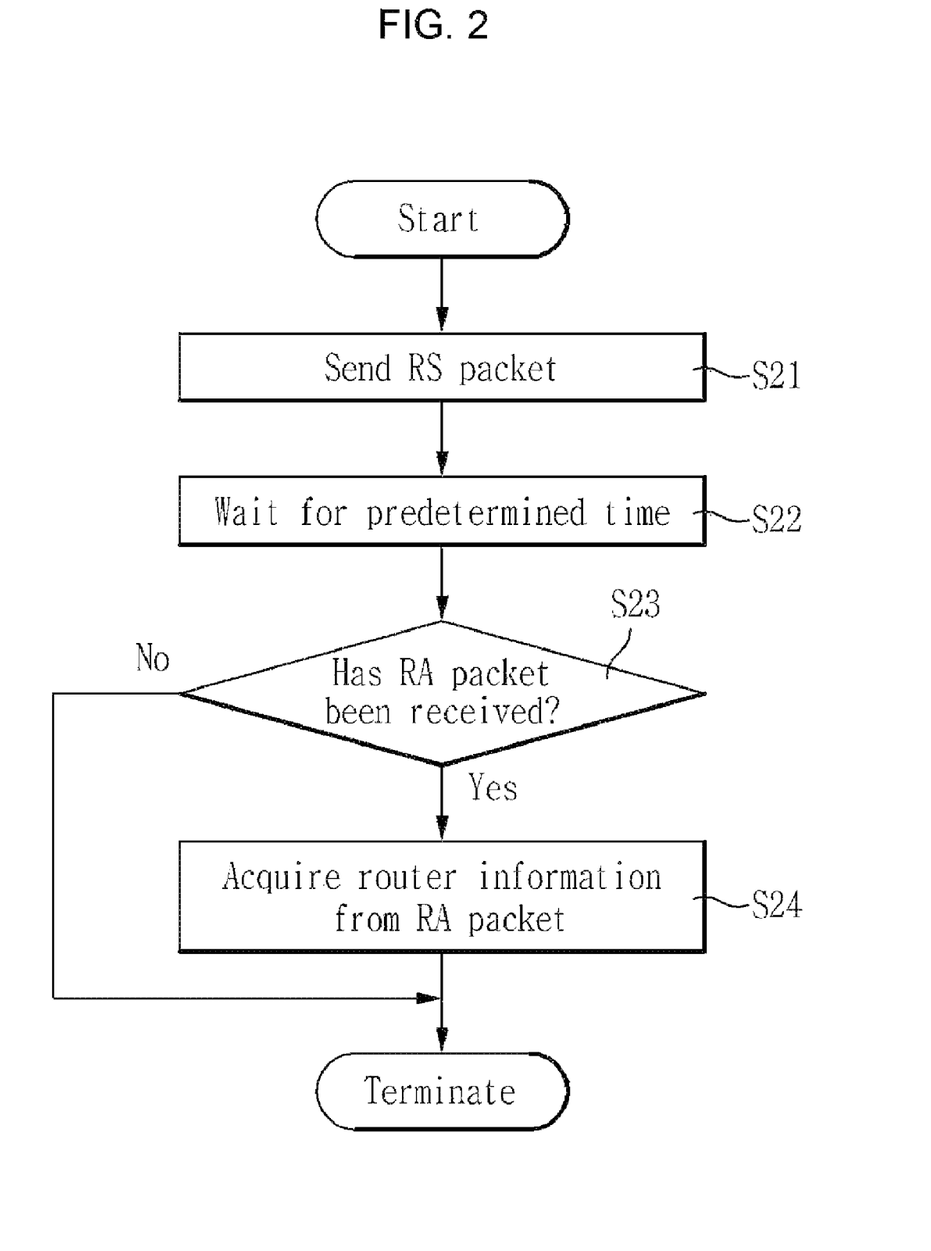
FIG. 2 is a flowchart illustrating a method of searching for a host using an RS packet and an RA packet according to an embodiment of the present invention.

FIG. 2 is a flowchart illustrating a method of searching for a host using an RS packet and an RA packet according to an embodiment of the present invention.

First, router information is requested by sending an RS packet to a network at step S21.

After the RS packet is transmitted, a predetermined time is waited by taking the processing speed of the router and the transfer rate according to a network environment and state at step S22.

Next, it is determined whether an RA packet has been received after the predetermined time of waiting at step S23. If, as a result of the determination, the RA packet is determined to have been received, the router information is acquired from the RA packet at step S24. On the other hand, if, as a result of the determination at step S23, the RA packet is determined not to have been received, the processing is terminated.

Figure 3:
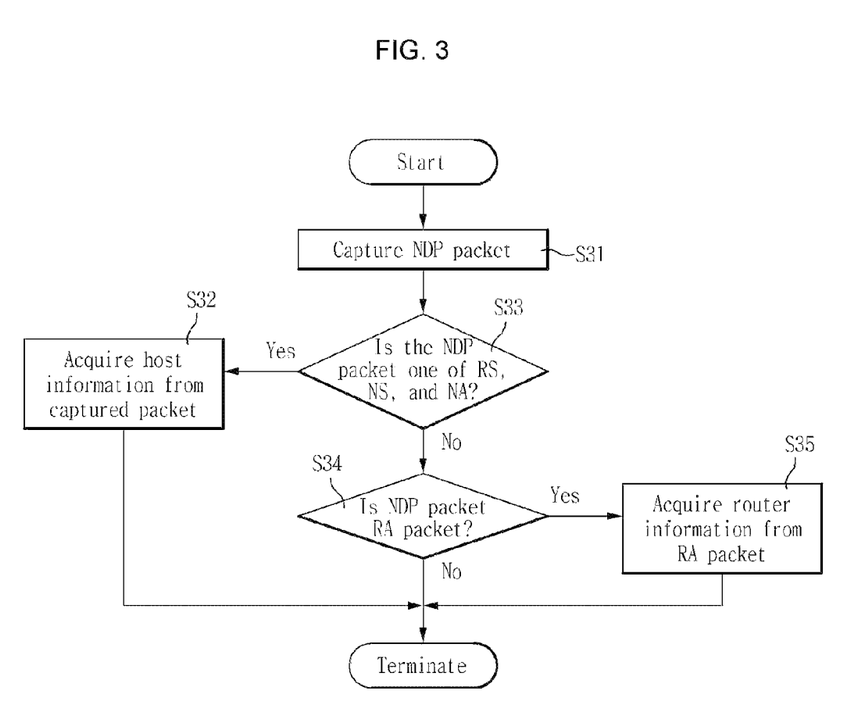
FIG. 3 is a flowchart illustrating a method of searching for a host and a router by analyzing an NDP packet captured in a network according to an embodiment of the present invention.

FIG. 3 is a flowchart illustrating a method of searching for a host and a router by analyzing an NDP packet captured in a network according to an embodiment of the present invention.

First, when an NDP packet is captured at step S31, it is determined whether the NDP packet is one of RS, NS, and NA packets at step S33.

If, as a result of the determination, the NDP packet is determined to be one of the RS, NS, and NA packets, host information is acquired from the captured packet at step S32. If, as a result of the determination at step S33, the NDP packet is determined not to be one of the RS, NS, and NA packets, it is determined whether the NDP packet is an RA packet at step S34.

If, as a result of the determination at step S34, the NDP packet is determined to be the RA packet, router information is acquired from the RA packet at step S35.

If, as a result of the determination at step S34, the NDP packet is determined not to be the RA packet, the processing is terminated.

<Block of Host>

In the present invention, the block of a host is performed using a DAD (Duplicate Address Detection) operation. A term 'modified NA (Neighbor Advertisement) packet of a blocked host' to be described later refers to an NA packet in which the link-layer address of the blocked host is set as a virtual link-layer address or a specific link-layer address not existing in a corresponding network. More particularly, when a DAD check packet from which an IP will be used by a host is captured in a network, the DAD check packet is analyzed. If, as a result of the analysis, access needs to be blocked, a response is made using a modified NA packet of a blocked host. The blocked host that has received the NA packet determines that the corresponding IP is already being used through the DAD operation and fails in allocating an IP to a network interface.

In addition, in the case where a host to which an IP has already been allocated needs to be blocked after the DAD operation is performed, when the NDP Packet of the blocked host is captured, the modified NA packet of the blocked host is set in the form of an all-node multicast IP and then transmitted. Hosts within a network receive the modified NA packet of the blocked host and update their neighbor caches, thus failing in communication with the blocked host.

In the method of blocking hosts according to the present invention, when a policy for blocking the hosts is set, a blocked IP address or blocked link-layer address is set as setting information. Alternatively, both the blocked IP address and the blocked link-layer address may be set. The policy may further selectively include the start time and the expiration time.

According to the present invention, when an NDP packet is captured, the type (i.e., RS, RA, NS, and NA) of the NDP packet is checked, and it is determined whether the corresponding packet is included in a block policy according to the type of the packet. If, as a result of the determination, the corresponding packet is determined to be included in the block policy, it is determined whether the corresponding packet is a DAD check packet. If, as a result of the determination, the corresponding packet is determined to be the DAD check packet, a response is made to a blocked host using a modified NA packet. If, as a result of the determination, the corresponding packet is determined not to be the DAD check packet, block is performed by sending a modified NA packet of the blocked host in the form of an all-node multicast IP. Meanwhile, if, as a result of the determination, the corresponding packet is determined not to be included in the block policy, the corresponding packet is disregarded and communication is permitted.

Additionally, if, as a result of the determination, the corresponding packet is determined to be the DAD check packet, block may be performed using a method of sending the modified NA packet of the blocked host in the form of an all-node multicast IP, in addition to the method of responding to the blocked host using the modified NA packet.

Hereinafter, a method of blocking hosts according to an embodiment of the present invention is described in detail below.

Figure 4:
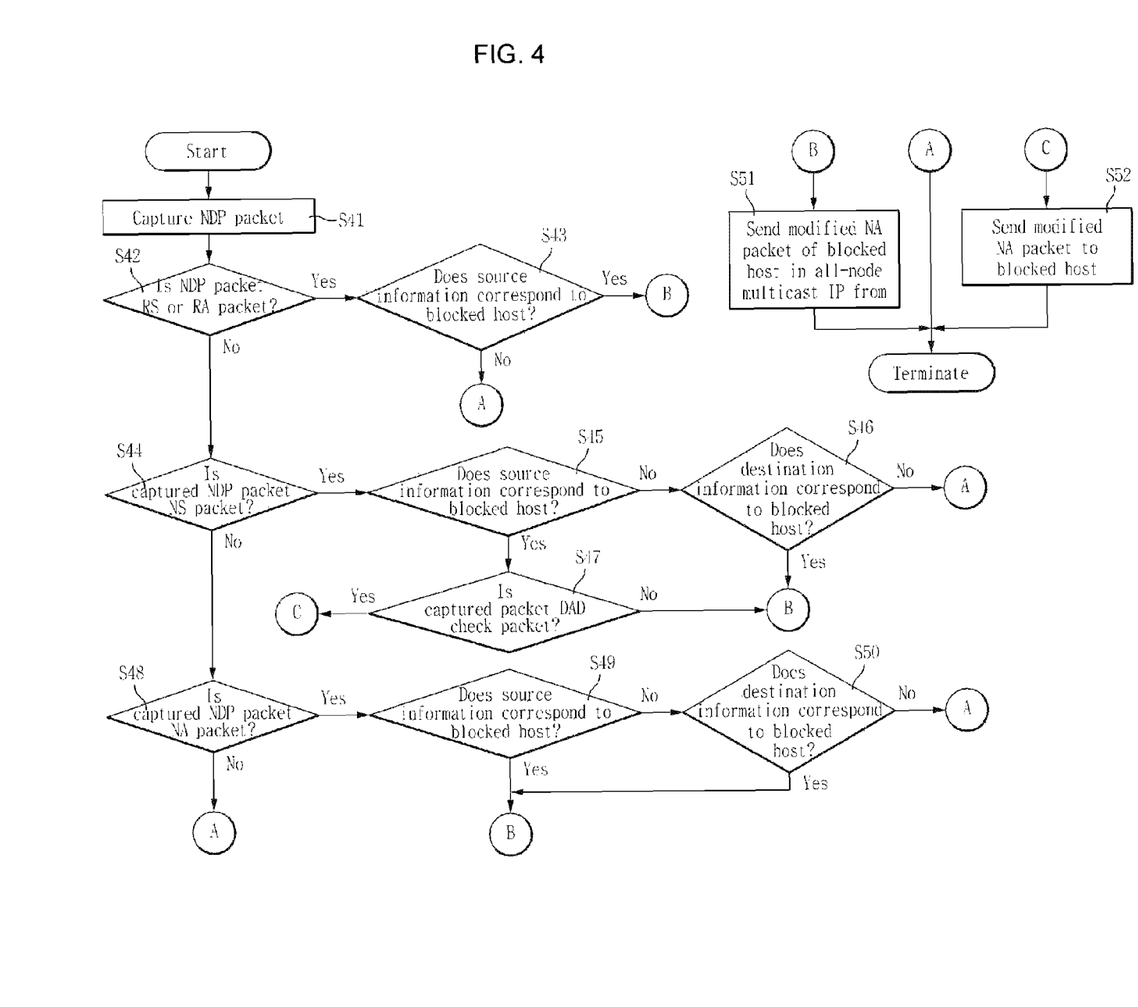
FIG. 4 is a flowchart illustrating a method of blocking hosts according to an embodiment of the present invention.

FIG. 4 is a flowchart illustrating a method of blocking hosts according to an embodiment of the present invention.

Here, source information is a source link-layer address or a source IP address, and destination information is a destination link-layer address or a destination IP address. Furthermore, a method of classifying blocked hosts is based on the IP address and link-layer address information. Additionally, when pieces of the source and destination information are classified, the source IP address or the destination IP address may not be valid according to the type of a packet. In this case, the target address of an ICMP6 header is replaced with the source IP or destination IP address information.

Referring to FIG. 4, when an NDP packet is captured at step S41, it is determined whether the captured NDP packet is an RS (Router Solicitation) or RA (Router Advertisement) packet at step S42.

If, as a result of the determination, the captured NDP packet is determined to be the RS or RA packet, it is determined whether source information of RS or RA packet corresponds to a blocked host at step S43. If, as a result of the determination at step S43, the source information is determined to correspond to the blocked host, a modified NA packet of the blocked host is transmitted in the form of an all-node multicast IP at step S51. If, as a result of the determination at step S43, the source information is determined not to correspond to the blocked host, the processing is terminated.

If, as a result of the determination at step S42, the captured NDP packet is determined not to be the RS or RA packet, it is determined whether the captured NDP packet is an NS (Neighbor Solicitation) packet at step S44. If, as a result of the determination at step S44, the captured NDP packet is determined to be the NS packet, it is determined whether source information of the NS packet corresponds to a blocked host at step S45. If, as a result of the determination at step S45, the source information is determined to correspond to the blocked host, it is determined whether the captured packet is a DAD check packet at step S47. If, as a result of the determination at step S47, the captured packet is determined to be the DAD check packet, a modified NA packet is transmitted to the blocked host at step S52, and the processing is terminated. If, as a result of the determination at step S47, the captured packet is determined not to be the DAD check packet, the step S51 is performed and the processing is terminated.

If, as a result of the determination at step S45, the source information is determined not to correspond to the blocked host, it is determined whether destination information of an ICMP header corresponds to a blocked host at step S46.

If, as a result of the determination at step S46, the destination information is determined to correspond to the blocked host, the step S51 is performed and the processing is then terminated. If, as a result of the determination at step S46, the destination information is determined not to correspond to the blocked host, the processing is terminated.

Meanwhile, if, as a result of the determination at step S44, the captured NDP packet is determined not to be the NS packet, it is determined whether the captured NDP packet is an NA (Neighbor Advertisement) packet at step S48. If, as a result of the determination, the captured NDP packet is determined to be the NA packet, it is determined whether source information corresponds to a blocked host at step S49. If, as a result of the determination at step S49, the source information is determined to correspond to the blocked host, the step S51 is performed and the processing is then terminated. On the other hand, if, as a result of the determination at step S49, the source information is determined not to correspond to the blocked host, it is determined whether destination information corresponds to a blocked host at step S50. If, as a result of the determination at step S50, the destination information is determined to correspond to the blocked host, the step S51 is performed and the processing is then terminated. If, as a result of the determination at step S50, the destination information is determined not to correspond to the blocked host, the processing is terminated. Meanwhile, if, as a result of the determination at step S48, the NDP packet is determined not to be an NA packet, the processing is terminated.

According to the configuration of the present invention, the major resources of a network can be efficiently managed and protected in an IPv6 environment. Particularly, unauthorized hosts can be prevented from accessing a network. Accordingly, a higher security environment can be constructed.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A method of blocking a host in an IPv6 network, the method comprising the steps of:
   when a policy for blocking the host from accessing the network is set, capturing a Neighbor Discovery Protocol (NDP) packet within the network;
   determining whether the captured NDP packet is included in the block policy according to the captured NDP packet type, where a packet type includes one of NS (neighbor solicitation), NA (neighbor advertisement), RS (router solicitation), and RA (router advertisement);
   if the captured NDP packet is an NS packet, determining whether the host is the blocked host based on source information of the NS packet;
   if the source information is determined to correspond to the blocked host, determining whether the captured NDP packet is a Duplicate Address Detection (DAD) check packet;
   if the captured NDP packet is included in the block policy according to the source information and the captured NDP packet is a DAD check packet, blocking the host by generating a modified NA packet for an IP of the host and sending the modified NA packet in a unicast IP form, wherein the host is unauthorized from accessing the network;
   otherwise, if the source information is determined not to correspond to the blocked host, determining whether the host is the blocked host based on destination information; and
   if the captured NDP packet is included in the block policy according to the destination information and the captured NDP packet is not a DAD check packet, blocking the host by generating a modified NA packet for an IP of the host and sending the modified NA packet in a multicast IP form, wherein the host is unauthorized from accessing the network.

2. The method as claimed in claim 1, wherein the host is blocked by multicasting or unicasting the modified NA packet in which a link-layer address of the NA packet is set as a virtual link-layer address or a specific link-layer address not existing in the network.

3. The method as claimed in claim 1, wherein the policy for blocking the host from accessing the network is managed in a list form.

4. The method as claimed in claim 1, wherein the policy for blocking the host from accessing the network comprises an IP address or a link-layer address.

5. The method as claimed in claim 1, wherein the policy for blocking the host from accessing the network comprises a start time and expiration time of the policy.

6. The method as claimed in claim 1, wherein the step of blocking the host is performed by sending the modified NA packet to the blocked host so that an allocation of an IP to a network interface of the blocked host is failed.

7. The method as claimed in claim 1, wherein the step of blocking the host is performed by sending the modified NA packet of the blocked host to hosts within the network to which the blocked host belongs so that neighbor caches are updated based on the modified NA packet of the blocked host and communication with the hosts is failed.

8. The method as claimed in claim 1, further comprising the step of, if the NDP packet captured in the network is an RS or RA packet, determining whether the host is the blocked host based on source information of the RS or RA packet.

9. The method as claimed in claim 8, wherein the source information comprises one or more of a source link-layer address, a source IP address, and a target address of an ICMPv6 header.

10. The method as claimed in claim 1, wherein the source information comprises one or more of a source link-layer address, a source IP address, and a target address of an ICMPv6 header.

11. The method as claimed in claim 1, wherein the destination information comprises one or more of a destination link-layer address, a destination IP address, and a target address of an ICMPv6 header.

12. The method as claimed in claim 1, further comprising the steps of: if the NDP packet captured in the network is the NA packet, determining whether source information of the NA packet corresponds to the blocked host; and if, as a result of the determination, the source information is determined not to correspond to the blocked host. determining whether destination information corresponds to the blocked host.

13. The method as claimed in claim 12, wherein the source information comprises one or more of a source link-layer address, a source IP address, and a target address of an ICMPv6 header.

14. The method as claimed in claim 12, wherein the destination information comprises one or more of a destination link-layer address, a destination IP address, and a target address of an ICMPv6 header.

* * * * *